United States Patent [19]

Port

[11] Patent Number: 5,697,638
[45] Date of Patent: Dec. 16, 1997

[54] VEHICLE STEERING WHEEL ARRANGEMENT

[75] Inventor: Nicholas Port, Köln, Germany

[73] Assignee: Ford Global Technologies, Inc., Dearborn, Mich.

[21] Appl. No.: 624,385

[22] PCT Filed: Aug. 8, 1994

[86] PCT No.: PCT/GB94/01732

§ 371 Date: Apr. 1, 1996

§ 102(e) Date: Apr. 1, 1996

[87] PCT Pub. No.: WO95/09745

PCT Pub. Date: Apr. 13, 1995

[30]     Foreign Application Priority Data

Oct. 2, 1993 [GB] United Kingdom ............... 93/20363

[51] Int. Cl.⁶ .................................................. B60R 21/22
[52] U.S. Cl. ................. 280/731; 280/728.2; 280/728.3
[58] Field of Search ............................. 280/728.1, 728.2, 280/728.3, 731, 732

[56]     References Cited

U.S. PATENT DOCUMENTS 3,910,597 10/1975 Seko ......................... 280/731
4,715,617 12/1987 Breed ........................ 280/731
5,211,421  5/1993 Catron et al. ............. 280/728.2
5,351,977 10/1994 Grace ........................ 280/739

FOREIGN PATENT DOCUMENTS 1003027 10/1991 Belgium .
 488618  6/1992 European Pat. Off. ........... 280/728.3
1549902 12/1967 France .
2164248  7/1973 France .

Primary Examiner—Eric D. Culbreth
Attorney, Agent, or Firm—Daniel M. Stock

[57]     ABSTRACT

A Vehicle steering wheel arrangement that includes a steering column (1) with a spindle (2) having fixed to its upper end a mounting hub (3). A steering wheel (8) is fastened to the mounting hub (3) to a free face (5) of which is attached an air-bag module (6). The steering wheel (8) has an integral cover (9) for the air-bag module (6) and has a cavity (10) beneath the cover (9) to permit the steering wheel (8) to be mounted over the air-bag module (6) and fastened to the mounting hub (3) after the attachment of the air-bag module (6) to the mounting hub (3) fixed to the spindle (2).

6 Claims, 1 Drawing Sheet

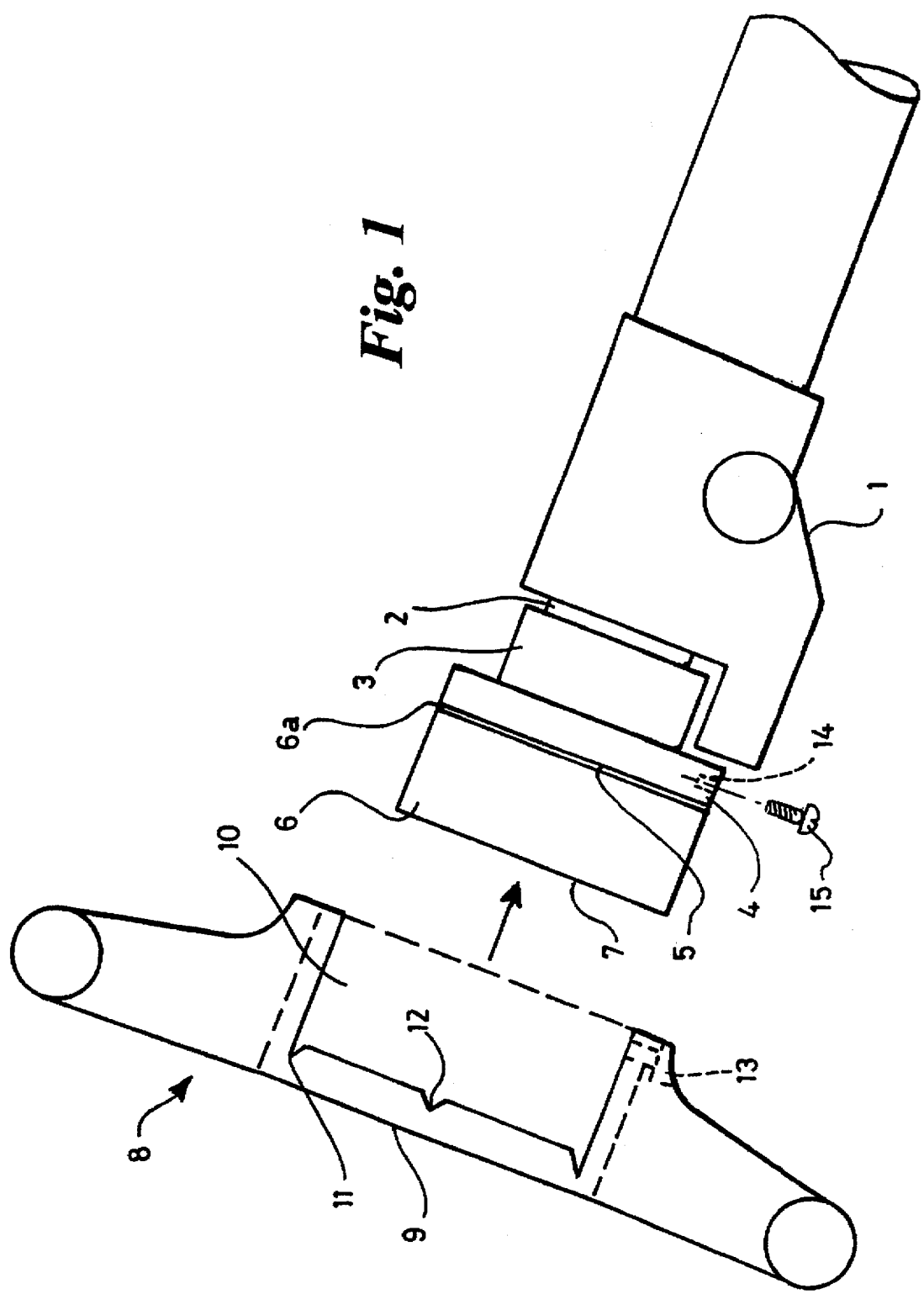

VEHICLE STEERING WHEEL ARRANGEMENT

BACKGROUND OF THE INVENTION

This invention relates to a vehicle steering wheel arrangement of the type adapted to accommodate an inflatable bag, commonly referred to as an air bag, as a safety provision.

With the safety of drivers of motor vehicles being put at increasing risk due to greater traffic density, a tendency for higher speed motoring and the attendant rise in motoring accidents, considerable attention has been paid by the motor industry to the development of improved steering wheel arrangements of the above-mentioned type.

While the development of air-bags which operate efficiently in accident emergency situations, has been all important, the development of the steering wheel arrangements which accommodate them and which can be economically produced and installed in motor vehicles on an assembly line, has also been important with a view to making this safety provision more generally available to the motoring public.

In general, proposals for steering wheel arrangements of the above-mentioned type have been such that the so-called airbags, in their inflatable condition, are required to be installed in the vehicle steering wheels prior to, or after, the steering wheels being fixed to their spindles comprising shafts of the steering columns.

According to the present invention there is provided a vehicle steering wheel arrangement comprising a steering column having therein a steering spindle, a mounting hub fixed to the upper end of the spindle, a steering wheel fastened to the mounting hub, wherein the mounting hub has an air bag module attached to a free face and wherein the steering wheel has an integral cover for the air-bag module and has a cavity beneath the cover such as to permit the steering wheel to be mounted over the air-bag module and to be fastened to the mounting hub to thereby house the air bag module in the cavity after the attachment of the air bag module to the mounting hub fixed to the spindle.

This invention provides a means whereby the cost of installation of air bags in motor vehicles on a production line may be substantially reduced. In this connection, the invention permits the air bag module to be attached, albeit indirectly, to the steering spindle before the steering column is installed in a motor vehicle. Further, this invention permits the steering column to be installed before installation of the steering wheel. Because of the limited space available within the driver compartment of a motor vehicle, the associated difficulties in installing an air-bag module in an already installed steering wheel are clearly obviated by this invention. Further, the absence of any need to pre-assemble air bag modules in steering wheels prior to installation leads to greater economy of operation because of the wide variety of steering wheel designs and the absence of the possibility of redundant units. Still further, the integral cover incorporated in the steering wheel employed in this invention reduces the number of manufacturing operations and obviates any need for matching. Finally, this invention provides for steering wheels to be rapidly changed after installation to suit a particular aesthetic or practical need of a customer, without any need to disturb the air bag module.

The vehicle to which the steering wheel arrangement of this invention relates is any steerable vehicle but it is preferably a motor vehicle, particularly a commercial road vehicle or motor car.

The steering column employed in this invention may be any tubular or other shaped support within which is housed the steering spindle. The upper end of the steering spindle may be provided with, for example, splines, grooves, keyways, screw threads or other means whereby the mounting hub may be fixed thereto. Alternatively the mounting hub may be more permanently fixed to the spindle as by welding, or may be integrally formed with the spindle, for example. The steering column may be provided with a locking device to interact with the steering wheel in known manner as a vehicle security measure.

The mounting hub may be of any plate-like, disc-like or other profile shape with an axis of rotation which can be aligned with that of the steering spindle. The mounting hub should be such that when it is fixed to the spindle it has a free face to which the air bag module can be attached. The mounting hub is preferably of circular cross-section and more preferably comprises a cylinder having a peripheral flange to provide an enlarged free face at that end remote from the spindle to which it is fixed.

The steering wheel employed in the present invention may be of any construction in which the cover for the air bag module and the cavity can be integrally formed. The construction may comprise, at least in part, a unitary moulding incorporating both the cover and the cavity. Such a unitary moulding may comprise a plastics material and may incorporate reinforcements. The steering wheel should be provided with means, such as a fastening hole, whereby it can be fastened to the mounting hub, by a screw for example.

The cover should be such that it is openable by forces exerted during inflation of the air bag to permit the air bag to substantially fully inflate on activation of an associated air bag inflation system as hereinafter described. To this end, the cover may be provided with at least one area, or at least one peripheral or transverse line of weakness, to ensure its efficient opening.

The cavity beneath the cover should be of such shape and dimensions to accommodate the air bag module attached to the mounting hub and to permit the steering wheel to be fastened to the mounting hub.

The air bag module comprises, as an essential component, a bag which is inflatable by a fluid such as air or other gas. Such so-called air bag employed in vehicles as a safety provision are sufficiently well known for their type to warrant no detailed description in this specification. In order to enable the bag to be conveniently handled and installed in the cavity, the module preferably comprises a container, which may include a lid, having sufficient strength to contain the bag in its uninflated state, but insufficient strength to contain the bag after its inflation has commenced. In this latter connection, a part of the container may be opened or destroyed immediately following commencement of inflation of the bag.

As is known, the so-called air bags are employed in conjunction with some type of crash sensor sensitive to rapid vehicle deceleration. On sensing a collision, the crash sensor activates a bag inflation system which then inflates the bag to provide impact protection for the vehicle driver. The bag inflation system may have, as its source of inflation gas, one or more of a solid propellant of pyrotechnic type and a stored liquified gas, for example.

In the steering wheel arrangement of the present invention, the air bag of the air bag module is employed similarly in conjunction with a crash sensor and a bag inflation system. The crash sensor may be a pressure sensitive pad or a pendulum device designed to send, when sensing a crash, an electrical signal to cause the ignition of a pyrotechnic type inflation gas source or to cause the opening of a seal to a stored liquified source of inflation gas, for example.

It is preferred that the air bag module includes the inflation gas source for the air bag. It is preferred also that the air bag module includes the crash sensor.

It is preferred that the inflation gas source employed is electrically activated. It is preferred that electrical connections are made between the vehicle's electrical system and the air bag module via at least one slip-ring and contact arranged between the steering column and the mounting hub.

Attachment of the air bag module to the mounting hub may be by bolting, clamping, bonding or by any other means.

It is preferred that the steering wheel arrangement of this invention is provided with gas vents communicating between the inside of the air bag of the air bag module and the free atmosphere to permit controlled escape of gas from the inflated air bag in order to soften driver impact. Such gas vents, when provided, should be sufficiently small as to not interfere with inflation of the air bag significantly. It is preferred that when such vents are provided, they include at least one vent passing through the mounting hub.

The invention will now be illustrated, by way of example only, with reference to the accompanying drawings in which:

FIG. 1 illustrates, in partly exploded semi-schematic form, a side elevational view of a steering wheel arrangement according to this invention.

In FIG. 1, a vehicle steering column 1 has within it the steering spindle 2. To the upper end of the steering spindle 2 is fixed the metal mounting hub 3 which comprises a cylindrical block having a peripheral flange 4. The peripheral flange 4 provides the mounting hub 3 with the enlarged free face 5 to which the air bag module 6 is attached with optional gasket 6a positioned in between. Although not shown, the upper end of the steering spindle 2 and a central bore in the mounting hub 3 have cooperating splined surfaces to facilitate locking of the mounting hub 3 on the steering spindle 2 against relative rotational movement. Further, the upper-most end of the steering spindle 2 is threaded and a cylinder, such as a cooperating nut recessed in the face 5 locks the mounting hub 3 to the steering spindle 2 to prevent relative axial movement.

The air bag module 6 comprises a cylindrical aluminium container incorporating a thin foil closure 7. The air bag module 6 contains (not shown) an inflatable air bag as so-called, and associated source of inflation gas of the pyrotechnic type. Also contained within the air bag module 6 is a crash sensor (not shown) of the pendulum switch type, and this is wired to a detonator for the pyrotechnic gas source and is wired to the vehicle's electrical system via conductors (not shown) which pass through the mounting hub 3 to cooperate with slip rings (not shown) on the steering column. The closure 7 has insufficient strength to resist the inflation pressure of the air bag when the inflation system is activated.

Attachment of the air-bag module to the mounting hub is by way of bolts (not shown) passed through holes in the flange 4 of the hub 3 and the gasket 6a and into threaded holes in the base of the module 6.

A series of small vent holes (not shown) in the air-bag, the base of the module 6, the gasket 6a and the flange 4 provide an escape route for gas from the inflated bag to soften any driver impact with the inflated bag.

The steering wheel, indicated generally by 8, is of plastics material moulded in known manner over metal structural reinforcements (not shown). The steering wheel 8 incorporates, in its central portion, the cover 9 and the cavity 10. The cover 9, which is circular in shape, is integrally moulded in the steering wheel 8. Moulded into the cover 9 is a peripheral notch 11 and a transverse notch 12 providing designed peripheral and transverse lines of weakness in the cover 9 whereby the cover 9 will not resist the inflation pressure of the air bag.

The cavity 10 beneath the cover 9 is such that the steering wheel can be mounted over the air bag module 6, in the direction indicated by the arrow shown, and fastened to the mounting hub 3 via holes 13, 14 and bolt 15. Three of such bolt fastenings are employed but only one is shown.

I claim:

1. A vehicle steering wheel arrangement comprising:

a steering column;

a steering spindle mounted in the steering column and having an upper end;

a mounting hub fixed to the steering spindle upper end and having a free face;

an air bag module directly fastened to the mounting hub free face; and a steering wheel fastened to the mounting hub, the steering wheel having an integral cover defining a cavity receiving the air bag module.

2. A vehicle steering wheel arrangement as claimed in claim 1 wherein the steering wheel comprises, at least in part, a unitary moulding incorporating both the cover and the cavity.

3. A vehicle steering wheel arrangement as claimed in claim 1 wherein the cover is provided with at least one area of weakness.

4. A vehicle steering wheel arrangement as claimed in claim 1, wherein the mounting hub comprises a cylinder having a peripheral flange and wherein the steering wheel is fastened to the mounting hub at the peripheral flange.

5. A vehicle steering wheel arrangement as defined in claim 1 wherein the cover is provided with at least one peripheral line of weakness.

6. A vehicle steering wheel arrangement as defined in claim 1 wherein the cover is provided with at least one transverse line of weakness.

* * * * *